United States Patent
Hurwitz et al.

(10) Patent No.: US 6,914,629 B1
(45) Date of Patent: Jul. 5, 2005

(54) IMAGE CAPTURE CONTROL

(75) Inventors: Jonathan Ephriam David Hurwitz, Edinburgh (GB); Peter Brian Denyer, Edinburgh (GB)

(73) Assignee: VLSI Vision Limited, Edinburgh (GB)

( * ) Notice: Subject to any disclaimer, the term of this patent is extended or adjusted under 35 U.S.C. 154(b) by 0 days.

(21) Appl. No.: 09/673,598

(22) PCT Filed: Apr. 30, 1999

(86) PCT No.: PCT/GB99/01365

§ 371 (c)(1),
(2), (4) Date: Oct. 18, 2000

(87) PCT Pub. No.: WO99/57887

PCT Pub. Date: Nov. 11, 1999

(30) Foreign Application Priority Data

May 1, 1998 (GB) .............................. 9809482

(51) Int. Cl.[7] ................................................ H04N 3/14
(52) U.S. Cl. ...................................... 348/296; 348/295
(58) Field of Search ............................ 348/295, 296, 348/297, 294, 298, 303, 311, 312

(56) References Cited

U.S. PATENT DOCUMENTS

| 5,422,670 A | * | 6/1995 | Fukui | 348/296 |
| 5,422,716 A | * | 6/1995 | Dempsey | 356/218 |
| 6,217,656 B1 | * | 4/2001 | Spiering et al. | 118/500 |

* cited by examiner

Primary Examiner—Tuan Ho
Assistant Examiner—Yogesh Aggarwal
(74) Attorney, Agent, or Firm—Alston & Bird LLP

(57) ABSTRACT

A method of operating a solid state image sensor (1) for the acquisition of an image generated by an asynchronous stimulus (S) is described in which the sensor is operated in conjunction with at least one detector (4) which detects the said asynchronous stimulus. The sensor is regularly reset so as to commence integration from a reset state of the sensor each time a period Tr has elapsed. The output of the detector(s) prior to each reset (R) is used to determine whether that reset is inhibited or not, whereby the likelihood of the stimulus being corrupted is prevented, or at least substantially reduced. A method is also proposed in which a portion of the sensor array is itself used as the detector (4) for detecting the asynchronous stimulus. A solid state image sensor incorporating a reset inhibition control function for carrying out the described method is also claimed.

15 Claims, 8 Drawing Sheets

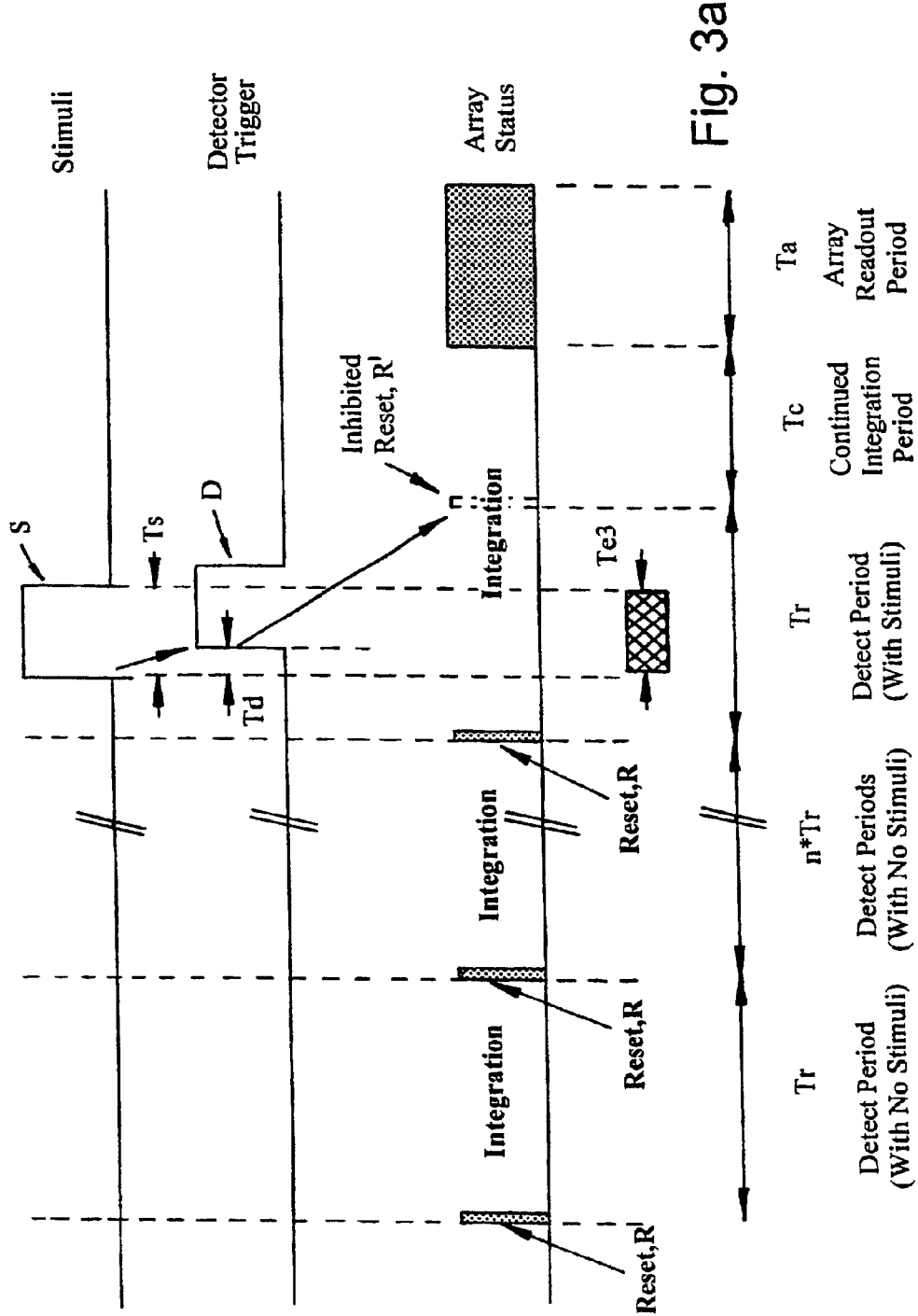

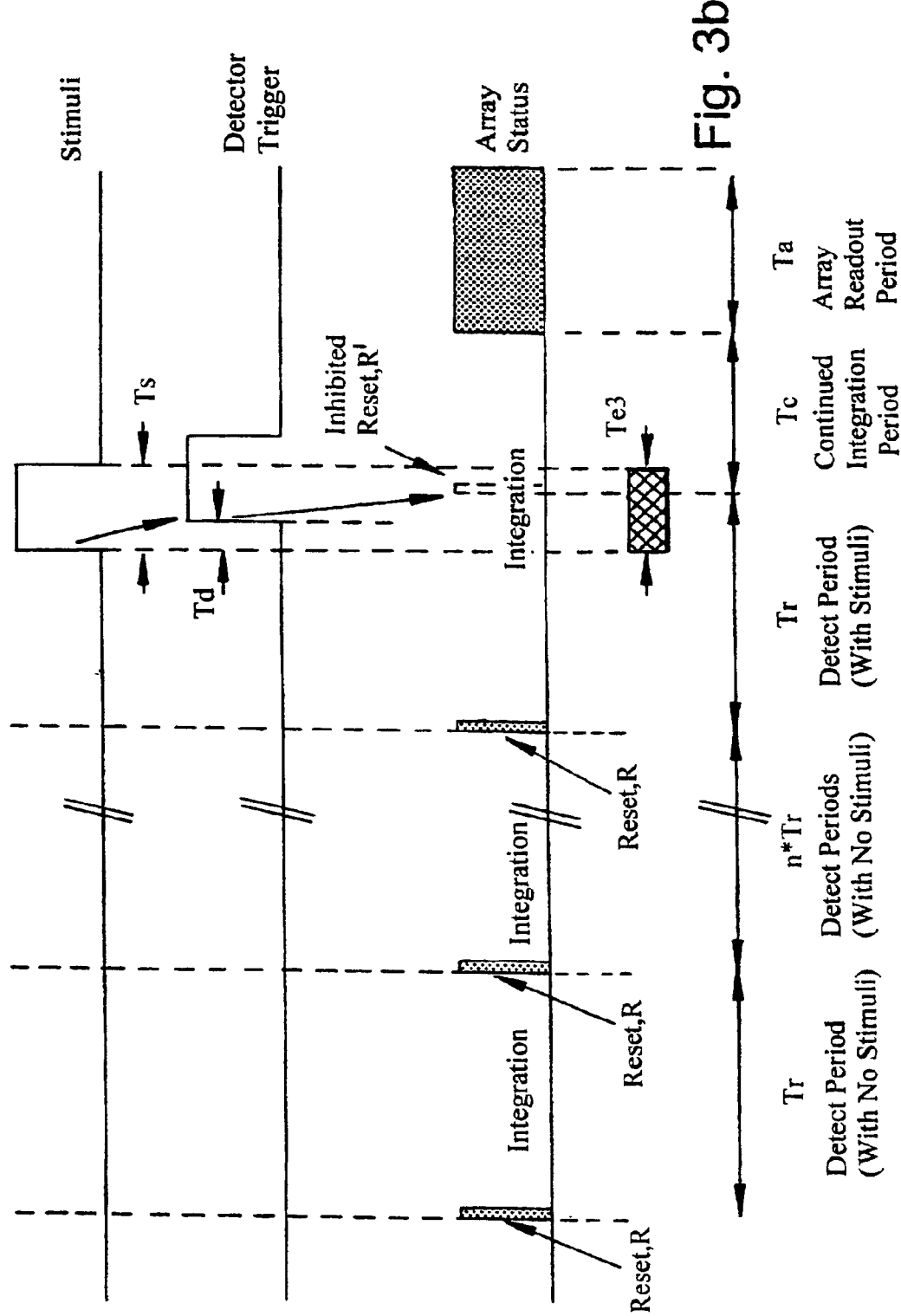

IMAGE CAPTURE CONTROL

BACKGROUND OF THE INVENTION

1. Field of the Invention

This patent application relates to techniques for acquiring images from a solid-state imager when exposure to the scene is controlled by either an asynchronous lighting strobe, or by the asynchronous opening of a shutter. The techniques that we describe do not require an electronic connection between the strobe/shutter and the sensor in order to work, and are hence applicable for use in systems where there is a physical reason, or an electronic reason, why this connection is not feasible.

2. Description of Related Art

Solid state image sensors dominate electronic imaging applications such as CCTV, video cameras and camcorders, and scanners, and are the basis of newly developed markets such as PC-cameras for videoconferancing, medical vision, machine vision and Digital Stills Cameras.

One popular form of image sensor is the Charge Coupled Device (CCD), whilst sensors built entirely within standard CMOS processes are also gaining currency. Roth have their relative merits when applied to these techniques.

As used herein the expression "asynchronous stimulus" means a stimulus the timing of whose occurrence is not known in advance and which stimulus is associated with the presentation of an image to be captured to the solid state image sensor. As discussed herein various kinds of solid state image sensors known in the art may be used in the present invention, including CCD sensors as well as sensors such as those disclosed in our earlier patent publication WO91/04633, in which, following a resetting of the sensing cells, charge is built up on the sensing cells in response to incident radiation impinging thereon and the built up charge subsequently converted into a voltage signal during an integration period, and this cycle repeated upon the next resetting of the sensing cells.

In some systems it is desirable to separate the operation of the sensor from the exposure mechanism. One such application is Electronic Film, for use in conventional Silver Halide Cameras such as 35 mm SLR (Single Lens Reflex). Here the solid state sensor replaces the chemical film within the camera, and as with chemical film the exposure is controlled by the shutter of the camera. In order that such an Electronic Film can work without user modification of the camera to access the shutter control signal, or with older non-electronic cameras, it is necessary for the sensor to auto-detect that it has been exposed. This system must offer a high probability of successful detection, and be scene independent, working under the widest possible range of camera exposures, and additional operating conditions such as flash and fill-in flash.

Another application is in medical vision and in machine vision, where exposure/illumination occurs through an illumination strobe, and there are physical or electronic reasons why a synchronisation pulse between the light source and the sensor cannot occur. For example it may be necessary to isolate the light source from the detector for reasons of safety, as in an X-ray system.

FIG. 1 shows a conventional general imaging system incorporating a solid state image sensor 1 (incorporating an array of sensing cells) with a shutter 2 (electronic, mechanical or electromechanical), a lighting strobe 3, and a detector 4. The imaging system also includes strobe/shutter control means 5, and sensor timing and detector control means 6. There is no timing interaction between the strobe/shutter control means 5, and the sensor timing and detector control means 6.

The shutter 2 and/or the lighting strobe 3 provide means of asynchronous stimulation of the image sensor 1 in order to capture an image of an object 7. The classic approach to the problem would be try to detect the asynchronous event and to then subsequently instigate an exposure and acquisition sequence for the image sensor. The problem with this approach is that it puts design pressure on achieving an asynchronous event detector that is sufficiently fast and reliable that the interaction between activating the image sensor and the asynchronous stimulus does not corrupt the effective exposure. FIG. 2 shows a timing diagram of an image acquisition sequence commonly used with the imaging system of FIG. 1, where the detector triggers the release from reset of the array of the sensor 1, putting it into integration. The array is then read when the stimulus has gone away. In this example the solid state image sensor 1 and the detector 4 see the stimulus simultaneously, as in the case of a lighting strobe 3. As can be seen the time for the detector to trigger, Td, reduces the effective amount of the stimulus, Ts, to an amount Te, that is approximately equal to:—

$$Te=Ts-Td$$

If there is a spatial distance between the detector 4 and the image plane of the solid state sensor 1 with respect to the stimulus, as in the case of a blade shutter 2 in an SLR camera, then the detector trigger time Td can result in a gradient of exposure across the array of the sensor 1. FIG. 2b shows an example of what would happen to an array if the detector 4 was located to the left hand side of the array, and the shutter 2 was opening from the right hand side of the array. If Tsh1 is the time the shutter takes to cross the array and Tsh2 is the subsequent time for the shutter to pass from the array to the detector, then as the diagram shows the two sides of the array see different effective stimuli, Te1 and Te2, as defined by:—

$$Te1=Ts-Td-Tsh1-Tsh2$$

$$Te2=Ts-Td-Tsh2$$

This problem can be reduced by using detectors on the side of the shutter that opens first, but still if the time to detect Td is greater than the time to reach the array Tsh2, then there will be a gradient of exposures across the array. The effective stimuli will be somewhere between the following values:—

$$(Ts-Tsh)<Te<(Ts-Td), \text{ where } Tsh2>Td$$

dependant on the position in the array. This is clearly undesirable.

BRIEF SUMMARY OF THE INVENTION

We describe a more radical approach to the problem that greatly increases the probability of successful detection of the asynchronous event with no degradation of the stimulus.

Thus, according to one aspect of the present invention we provide a method of operating a solid state image sensor for the acquisition of an image generated by an asynchronous stimulus, wherein said image sensor is operated in conjunction with at least one detector which, directly or indirectly, detects the said asynchronous stimulus, said image sensor is regularly reset so as to commence integration from a reset state of the sensor each time a predetermined period has elapsed, and an output from said at least one detector prior to each reset is used to determine whether that reset is inhibited or not.

According to a further aspect of the invention we provide a method of using a solid state image sensor, comprising an array of sensing cells, for the acquisition of an image generated by an asynchronous stimulus, wherein said image sensor is regularly reset so as to commence integrating from a reset state of the sensor each time a predetermined period has elapsed, and wherein a portion of the array of the sensor is read prior to each said reset and the value of this read is used to determine whether the subsequent reset should be inhibited or not.

According to yet another aspect of the present invention we provide image capture control apparatus suitable for use with a solid state image sensor for the acquisition of an image presented to the sensor in response to an asynchronous stimulus, said apparatus comprising at least one detector means formed and arranged for detecting, in use of the apparatus, directly or indirectly, a said asynchronous stimulus, and reset inhibition control signal output means formed and arranged for generating a reset inhibition control signal in response to detection of said asynchronous stimulus and supplying it, directly or indirectly, in use of the apparatus, to a reset signal generating means operatively coupled to said solid state image sensor, so as to inhibit the application of at least one subsequent reset signal to the sensor.

The image capture control apparatus may be provided in a single device. Alternatively, the apparatus may be provided in the form of separate modules.

In a further aspect, the present invention provides a camera having a solid state image sensor, wherein is provided image capture control apparatus as above-described.

BRIEF DESCRIPTION OF THE SEVERAL VIEWS OF THE DRAWINGS

Preferred embodiments of the invention will now be described by way of example only and with reference to the accompanying drawings in which:

FIG. 3a is a diagram of the relative timing of various operations carried out in a method of operating the system of FIG. 1 according to the present invention, where an asynchronous event occurs in a "detect period" Tr;

FIG. 3b is a diagram of the relative timing of various operations carried out in a method of operating the system of FIG. 1 according to the present invention, where the asynchronous event straddles two detect periods Tr;

DETAILED DESCRIPTION OF THE INVENTION

Figure 1:
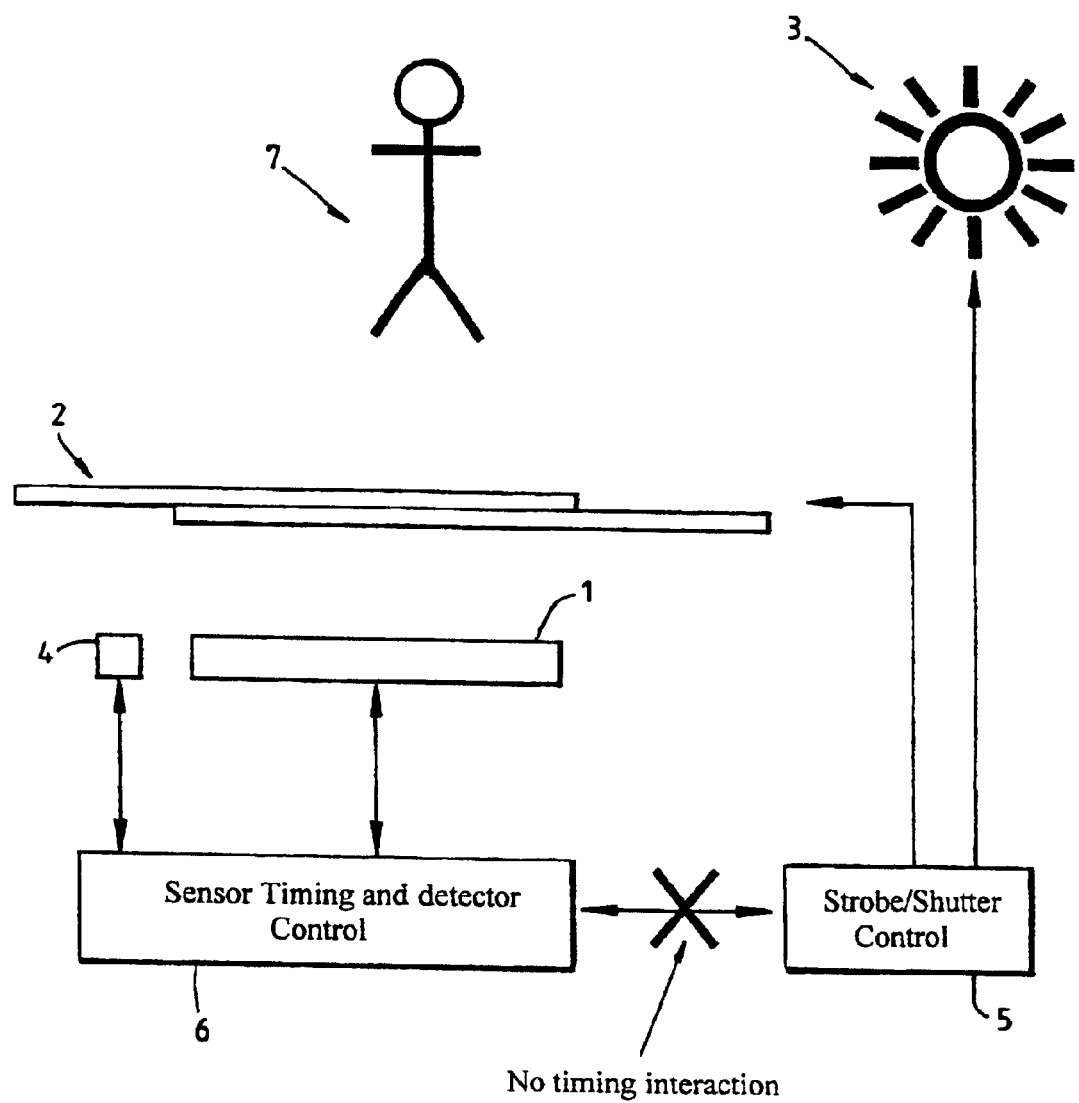
FIG. 1 is a schematic diagram of an imaging system incorporating a solid state sensor exposed to an asynchronous stimulus.

The method of the invention can be briefly described in the following manner, with reference to the imaging system of FIG. 1:— a) The image sensor is regularly reset, at a repetition rate of 1/Tr. The period Tr between each reset pulse R is hereinafter referred to as the detect period Tr. In this period Tr between the reset pulses R the image sensor 1 is integrating any incident light.

b) If during a given detect period Tr the detector 4 has fired, indicating that there has been some asynchronous stimulus, which is of duration Ts, then the next reset pulse R' is inhibited, and the sensor enters its "continued integration period", Tc.

c) In the continued integration period, Tc, the integration of the array is continued to beyond the extent of the longest asynchronous stimulation, Ts(max). This may either be a fixed time or a time based on a trigger by a detector that the stimulus has gone away. The sensor now enters the readout period.

d) In the array readout period, Ta, the array is readout, and can then go back to the detect period Tr to await the next asynchronous event (i.e. stimulus).

We have called this approach the 'inhibited reset' approach.

FIG. 3a shows the basic timing for an asynchronous event S that occurs totally inside the detect period Tr, and FIG. 3b an event S that would straddle a reset pulse R (hereinafter referred to as a "reset" R), but for the 'inhibited reset', (i.e. the event S straddles the inhibited reset R'). The time for the detector to fire is Td, and the probability of acquiring the asynchronous event without any corruption is:—

Probability of success=$(Tr-Td)/Tr$ and normally $Tr>>Td$

Figure 2A:
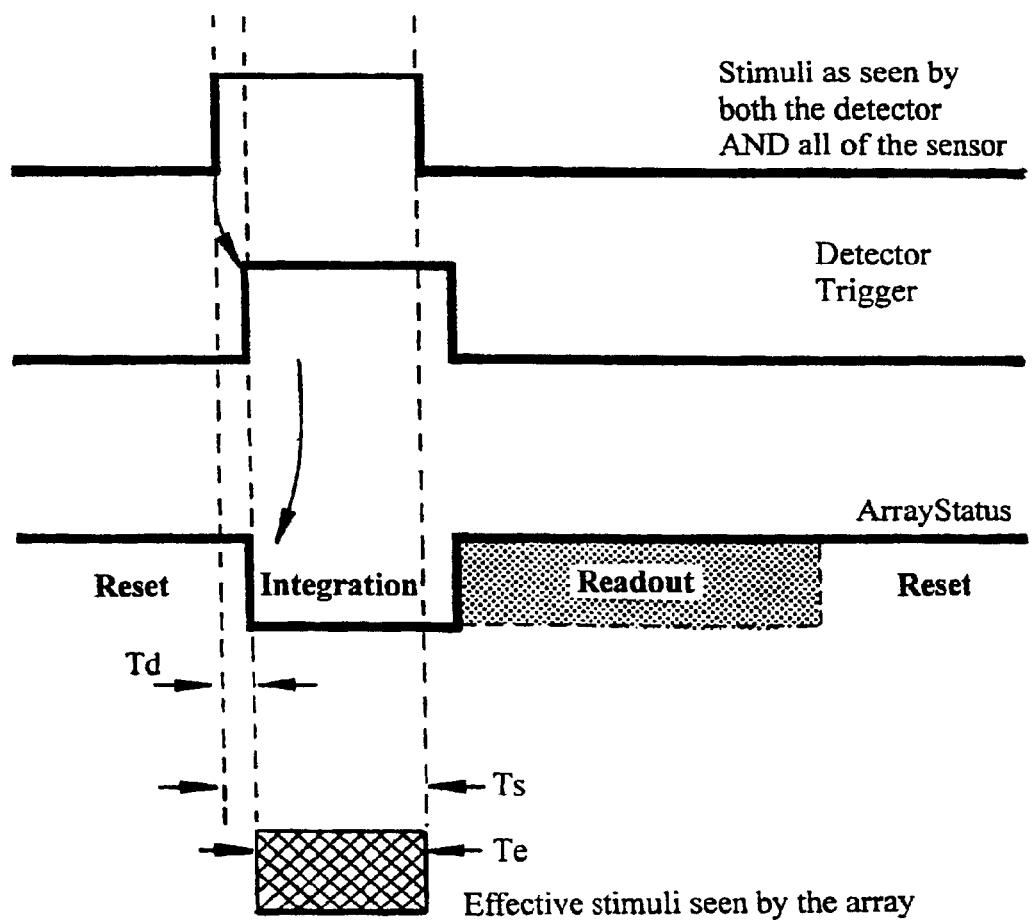
FIG. 2a is a diagram showing the relative timing of various operations carried out in a conventional method of operating the system of FIG. 1.
Figure 2B:
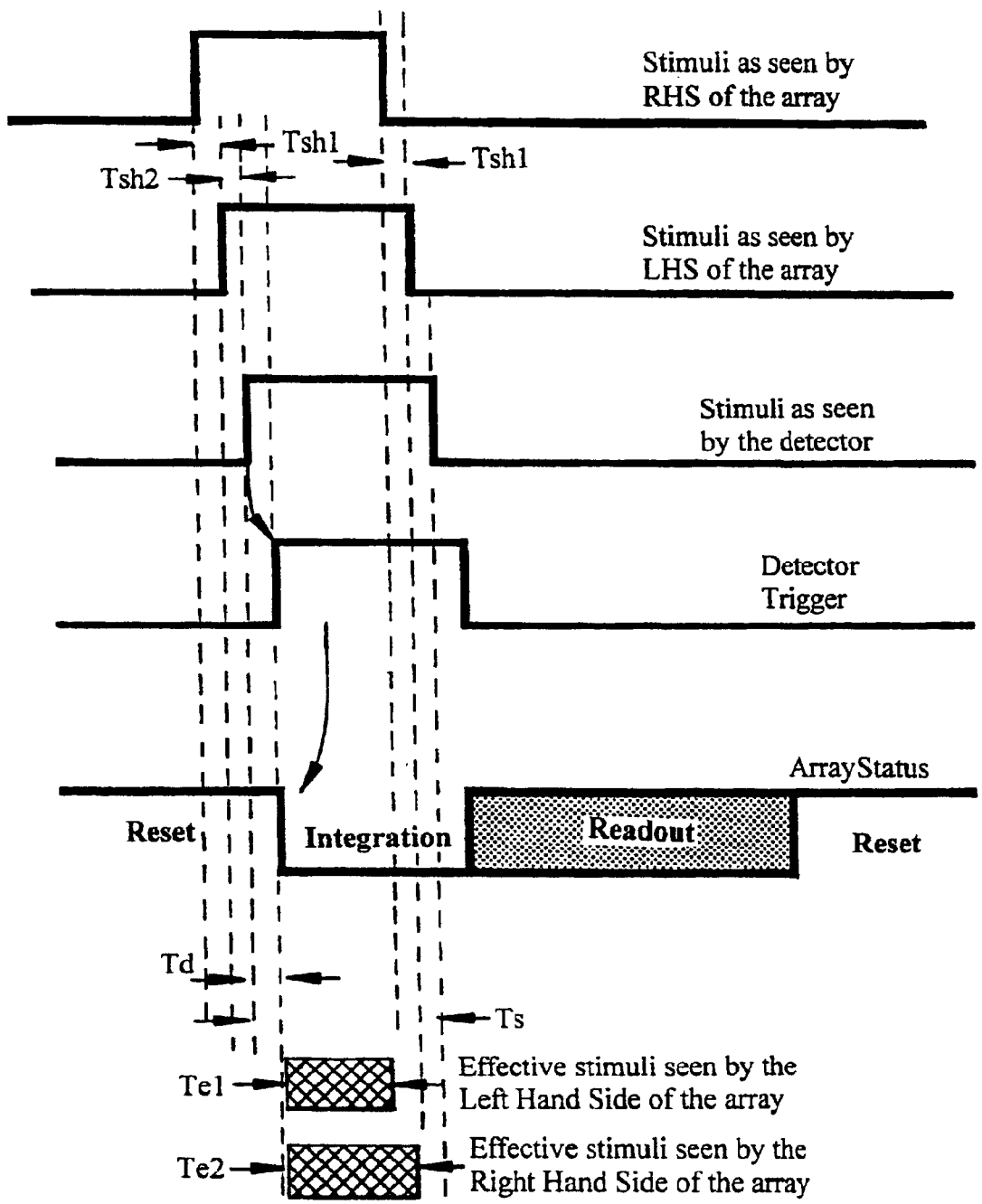
FIG. 2b is a diagram showing the relative timing of various operations carried out in a further known prior art method of operating the system of FIG. 1.
Figure 3C:
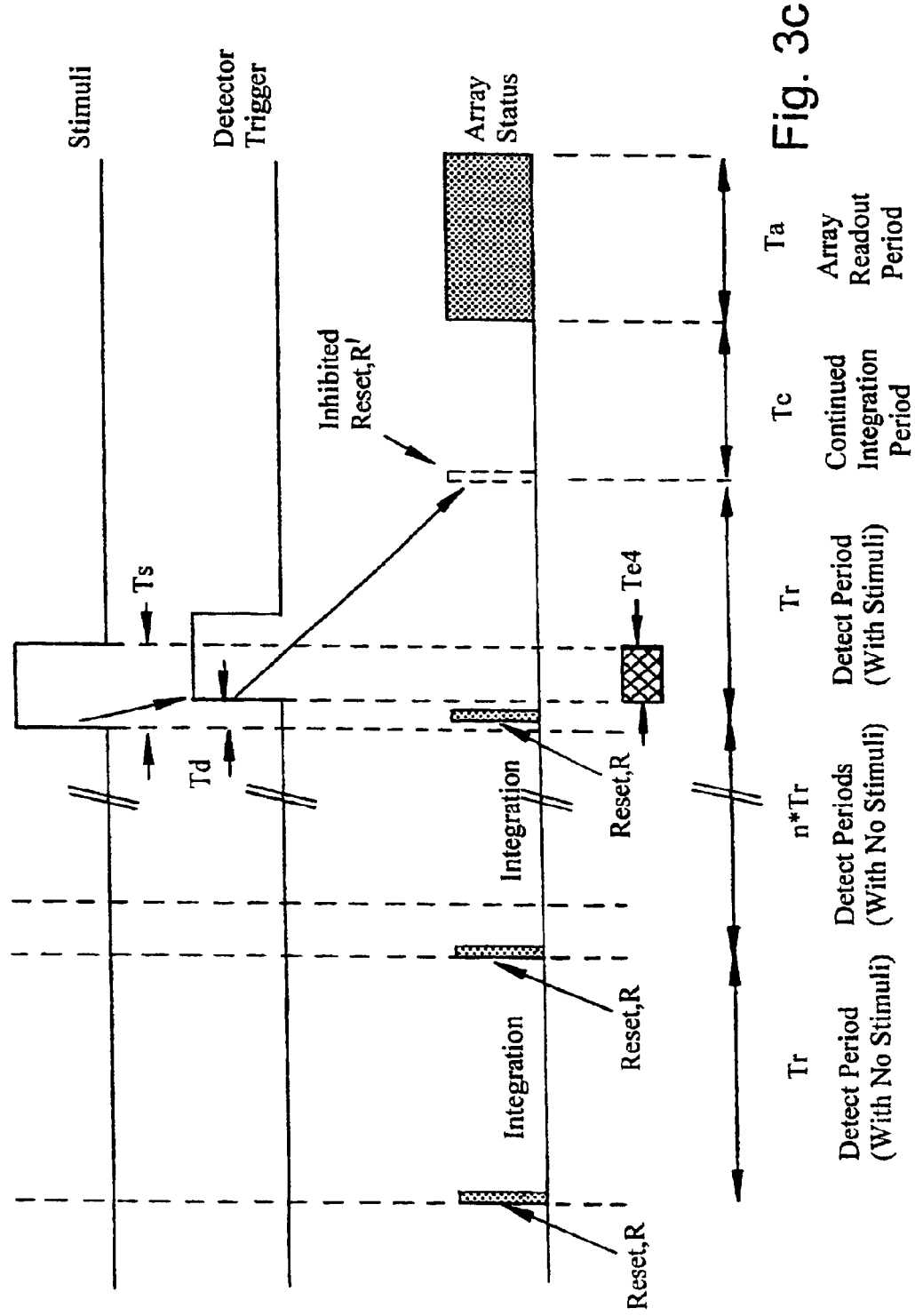
FIG. 3c is a diagram of the relative timing of various operations carried out in a method of operating the system of FIG. 1 according to the present invention, where the asynchronous event occurs close to the end of the detect period Tr.

Note in both cases the effective exposure, Te3, seen by all of the array and the detector is the full time of the stimuli, Te3=Ts FIG. 3c shows the case where the stimulus occurs <Td away from where the reset R would occur. In this case the reset R would NOT be inhibited in time, but it is important to note that this is no worse than the classic approach described earlier with reference to FIG. 2c.

In this case the effective exposure, Te4 is

Te4=Ts-Td

Figure 5:
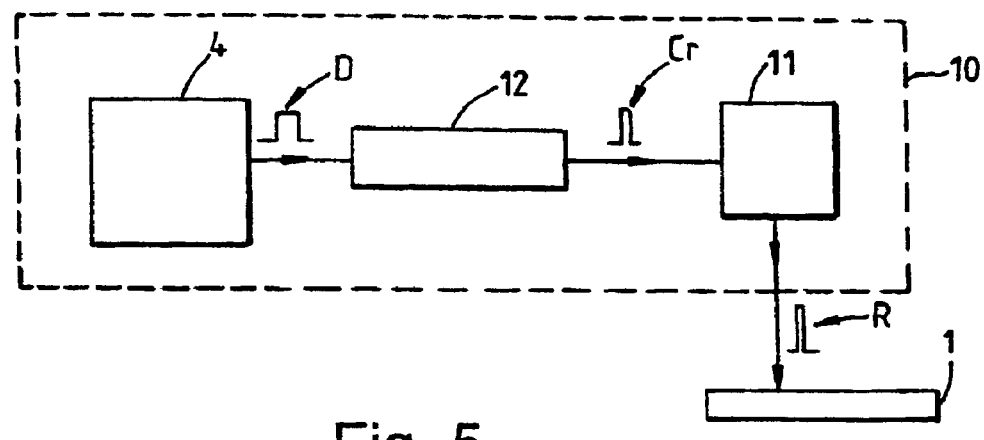
FIG. 5 is a block diagram of one embodiment of image capture control apparatus for carrying out the method of the invention.

FIG. 5 illustrates schematically one embodiment of image capture control apparatus for implementing the above-described method of the invention. The apparatus 10 comprises the detector 4, a reset signal generating unit 11 for generating the reset signals R, and reset inhibition control signal output means 12 for generating a reset inhibition control signal for supplying to the reset signal generating unit 11. When the detector 4 detects an asynchronous stimulus it outputs a detection signal D (see FIG. 3) to the reset inhibition control signal output means 12 which generates a reset inhibition control signal Cr which is supplied to the reset signal generating unit 11 so as to inhibit the application of the subsequent reset pulse R' to the sensor array. It will be appreciated that the reset inhibition control signal output means 12, if desired, may be incorporated in the detector 4 (e.g. in a single device), or may be incorporated in the reset signal generating unit 11, or may be provided as a separate module. Similarly, the reset signal generating unit 11 may be incorporated in the sensor 1. Equally, the apparatus 10 may together be incorporated in the image sensor 1, if desired, or may be provided as one or more separate modules for use therewith.

The detector 4 in both the classic approach and the 'inhibited reset' approach need not be a direct detector, i.e. another optical sensor that is also looking for the same type of optical stimuli, although this is by far the most popular approach. An example of an indirect detector which could be used is a vibration transducer, or a sound transducer, for detecting the movement of a physical shutter.

In the case of the optical detector 4, it is often co-located with the image sensor 1, but it is not possible to put it in the same focal plane as the image sensor. This can give problems in a lensed system as the detector may not be focused on a part of the scene with sufficient luminance to trigger it.

Figure 4:
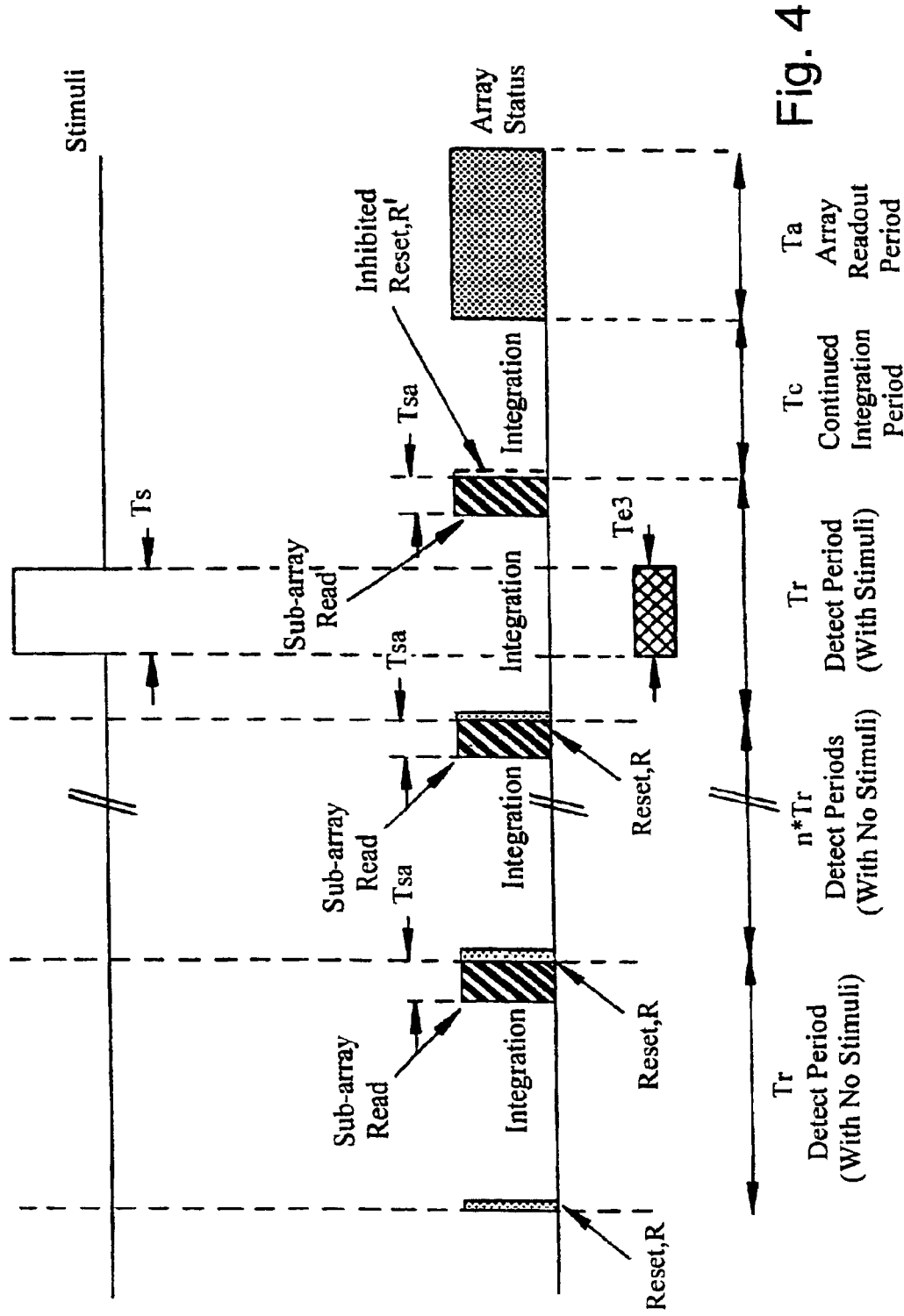
FIG. 4 is a diagram of the relative timing of various operations carried out in another method of operating the system of FIG. 1 according to the present invention, in which a portion of the sensor array is used to detect the asynchronous stimulus.

However, with our 'Inhibited reset approach' it is possible to use a sub-sampled portion of the sensor array, in such a way that the sensor array itself can act as the detector of the asynchronous stimulus. This is because the array is already integrating during its detect period, therefore by reading it before the decision to inhibit reset or not, we have a sample of the light that has been integrated by the array. By comparing these values with the values obtained when there has been no stimulus, we have a measure of the change. If this change is greater than a user defined threshold, then we say that an asynchronous stimulus has occurred. The choice of this threshold, relative to the lowest energy stimulus it is desired to detect, determines the effective time to detect, Td, in the following way. With reference to FIG. 4, if Ts is the longest stimuli to cause saturation of the image sensor, Tsa is the time to read the sub-array, and Pt is the percentage of saturation that is required to trigger a threshold of detection, then the effective Td is $$Td=(Ts*Pt)+Tsa$$

The major advantage of this approach is that the array itself is acting as the detector and is therefore in the focal plane of the focused image. Spatially distributing the sub-sample, greatly increases the probability that some of the pixels of the sub-sample are in areas with sufficient luminance.

It is of course possible to use our described 'Inhibited reset approach' with a plurality of detectors and sub-sampled arrays, to determine if an asynchronous event has occurred.

Various other modifications and variations of the above-described embodiments are also possible without departing from the scope of the invention. For example, in relation to the continued integration period, Tc, it will be appreciated that this could be an extended period corresponding in effect to the inhibition of more than one reset pulse i.e. a series of successive reset pulses.

What is claimed is:

1. A method of operating a solid state image sensor for the acquisition of an image presented to the sensor in response to an asynchronous stimulus, wherein said image sensor is operated in conjunction with at least one detector which, directly or indirectly, detects said asynchronous stimulus, said image sensor is regularly reset so as to commence integration from a reset state of the sensor each time a predetermined period has elapsed, and an output from said at least one detector prior to the end of a current predetermined period determines whether the subsequent reset operation of said image sensor is inhibited or not in that if said output indicates the occurrence of said asynchronous stimulus then the subsequent reset operation of said image sensor is inhibited, and said image sensor is allowed to continue integration commenced after a last reset operation before the occurrence of said asynchronous stimulus, whereby image data captured by the image sensor after said last reset operation before the occurrence of said asynchronous stimulus is stored and used in the acquisition of said image, and image capture data therefore includes image data occurring prior to the occurrence of said asynchronous stimulus.

2. A method according to claim 1 wherein the detector outputs a detection signal when said asynchronous stimulus is detected, and said detection signal is used to trigger a reset inhibition control signal for inhibiting a subsequent reset signal to the sensor.

3. A method of using a solid state image sensor comprising an array of sensing cells, for the acquisition of an image presented to the sensor in response to an asynchronous stimulus, wherein said image sensor is regularly reset so as to commence integrating from a reset state of the sensor each time a predetermined period has elapsed, and wherein a portion of the array of the sensor is read prior to the end of a current predetermined period and the value of this read is used to determine whether a subsequent reset signal to the sensor should be inhibited or not in that if said value indicates the occurrence of an asynchronous stimulus then said subsequent reset signal is inhibited, and said image sensor is allowed to continue integration commenced after a last reset operation before the occurrence of said asynchronous stimulus, whereby image data captured by the image sensor after said last reset operation before the occurrence of said asynchronous stimulus is stored and used in the acquisition of said image, and image capture data therefore includes image data occurring prior to the occurrence of said asynchronous stimulus.

4. A method according to claim 3, wherein said portion of the array read prior to each reset comprises a plurality of sensing cells which are spatially distributed throughout the array of sensing cells.

5. A method according to claim 1 wherein the asynchronous stimulus is the opening of a camera shutter.

6. A method according to claim 1 wherein the asynchronous stimulus is a flash of light from a lighting strobe.

7. Image capture control apparatus suitable for use with a solid state image sensor for the acquisition of an image presented to the sensor in response to an asynchronous stimulus, wherein said image sensor is regularly reset so as to commence integration from a reset state of the sensor each time a predetermined period has elapsed, said apparatus comprising at least one detector means formed and arranged for detecting, in use of the apparatus, directly or indirectly, said asynchronous stimulus, and reset inhibition control signal output means formed and arranged for generating a reset inhibition control signal in response to detection of said asynchronous stimulus and supplying it, directly or indirectly, in use of the apparatus, to a reset signal generating means operatively coupled to said solid state image sensor, so as to inhibit the application of at least one subsequent reset signal to the sensor whenever the occurrence of said asynchronous stimulus has been detected during a current predetermined period, and said image sensor is allowed to continue integration commenced after a last reset operation before the occurrence of said asynchronous stimulus, whereby image data captured by the image sensor after said last reset operation before the occurrence of said asynchronous stimulus is stored and used in the acquisition of said image, and image capture data therefore includes image data occurring prior to the occurrence of said asynchronous stimulus.

8. Image capture control apparatus according to claim 7 wherein said at least one detector means and said reset inhibition control signal output means are provided in a single device.

9. Image capture control apparatus according to claim 7, wherein said reset inhibition control signal output means and said reset signal generating means are provided together in a single device.

10. Image capture control apparatus according to claim 7 wherein the detector is formed and arranged for detecting the opening of a camera shutter.

11. Image capture control apparatus according to claim 7 wherein the detector is formed and arranged for detecting a flash of light from a lighting strobe.

12. A camera having a solid state image sensor, wherein is provided image capture control apparatus according to claim 7.

13. Image capture control apparatus suitable for use with a solid state image sensor for the acquisition of an image presented to the sensor in response to an asynchronous stimulus, said apparatus comprising at least one detector means formed and arranged for detecting, in use of the apparatus, directly or indirectly, said asynchronous stimulus, and reset signal generating means operatively coupled to said solid state image sensor for regularly resetting the image sensor, in use of the apparatus, so that the sensor commences integrating from a reset state thereof each time a predetermined period has elapsed, reset inhibition control signal output means formed and arranged for generating a reset inhibition control signal in response to detection of said asynchronous stimulus and supplying it, directly or indirectly, in use of the apparatus to said reset signal generating means, so as to inhibit the application of at least one subsequent reset signal to the sensor, and said image sensor is allowed to continue integration commenced after a last reset operation before the occurrence of said asynchronous stimulus, whereby image data captured by the image sensor after said last reset operation before the occurrence of said asynchronous stimulus is stored and used in the acquisition of said image, and image capture data therefore includes image data occurring prior to the occurrence of said asynchronous stimulus.

14. A method according to claim 3, wherein the asynchronous stimulus is the opening of a camera shutter.

15. A method according to claim 3, wherein the asynchronous stimulus is a flash of light from a lighting strobe.

* * * * *